(12) United States Patent
Raja Jayaraman et al.

(10) Patent No.: US 11,429,432 B2
(45) Date of Patent: Aug. 30, 2022

(54) REPOSITIONING APPLICATIONS FROM PHYSICAL DEVICES TO THE CLOUD

(71) Applicant: VMware, Inc., Palo Alto, CA (US)

(72) Inventors: Vignesh Raja Jayaraman, Palo Alto, CA (US); Sisimon Soman, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 322 days.

(21) Appl. No.: 16/746,142

(22) Filed: Jan. 17, 2020

(65) Prior Publication Data
US 2021/0224105 A1   Jul. 22, 2021

(51) Int. Cl.
| G06F 9/48 | (2006.01) |
| G06F 9/455 | (2018.01) |
| G06F 8/61 | (2018.01) |
| G06F 21/51 | (2013.01) |
| G06F 11/34 | (2006.01) |

(52) U.S. Cl.
CPC .............. *G06F 9/4856* (2013.01); *G06F 8/61* (2013.01); *G06F 8/62* (2013.01); *G06F 9/455* (2013.01); *G06F 21/51* (2013.01); *G06F 11/3457* (2013.01); *G06F 2221/033* (2013.01)

(58) Field of Classification Search
None
See application file for complete search history.

(56) References Cited

U.S. PATENT DOCUMENTS 8,666,938 B1    3/2014 Pancholy
9,841,966 B2 *  12/2017 Alevoor .............. G06F 9/45558

OTHER PUBLICATIONS

Rouse, M., "Citrix XenApp", Search Virtual Destop.com, https://searchvirtualdesktop.techtarget.com/definition/Citrix-XenApp?vgnextfmt=print, Jan. 20, 2017, 2 pages.
Unknown, "ThinApp—Virtualize Applications with ThinApp and Streamline App Delivery and Management", VMware, https://www.vmware.com/products/thinapp.html, 2020, 5 pages.
Unknown, "App Volumes—VMware App Volumes Provides Faster Application Delivery and Simplified Management", VMware, https://www.vmware.com/products/appvolumes.html, 2020, 6 pages.

(Continued)

*Primary Examiner* — Qing Yuan Wu

(57) ABSTRACT

The disclosure provides for repositioning applications from physical devices to a cloud location without removing the applications from the physical devices. This provides advantages of cloud-based availability for the applications while preserving device configurations. Thus, a user may continue to use the local version during transition to cloud usage so that if a problem arises during transition, adverse effects on user productivity are mitigated. Examples include generating, on a device, a first virtualization layer, and uninstalling an application from the first virtualization layer while capturing uninstallation traffic within the first virtualization layer. Examples further include generating, on the device, a second virtualization layer, installing the application in the second virtualization layer, and generating, from the second virtualization layer with the installed application, an application package. Examples are able to position the application package on a remote node for execution.

20 Claims, 8 Drawing Sheets

(56) References Cited

OTHER PUBLICATIONS

Unknown, "What is MSIX" https://docs.microsoft.com/en-us/windows/msix/overview, Dec. 1, 2019, 2 pages.

Unknown, "Getting started with App-V for Windows 10", https://docs.microsoft.com/en-us/windows/application-management/app-v/appv-getting-started, Apr. 17, 2018, 4 pages.

* cited by examiner

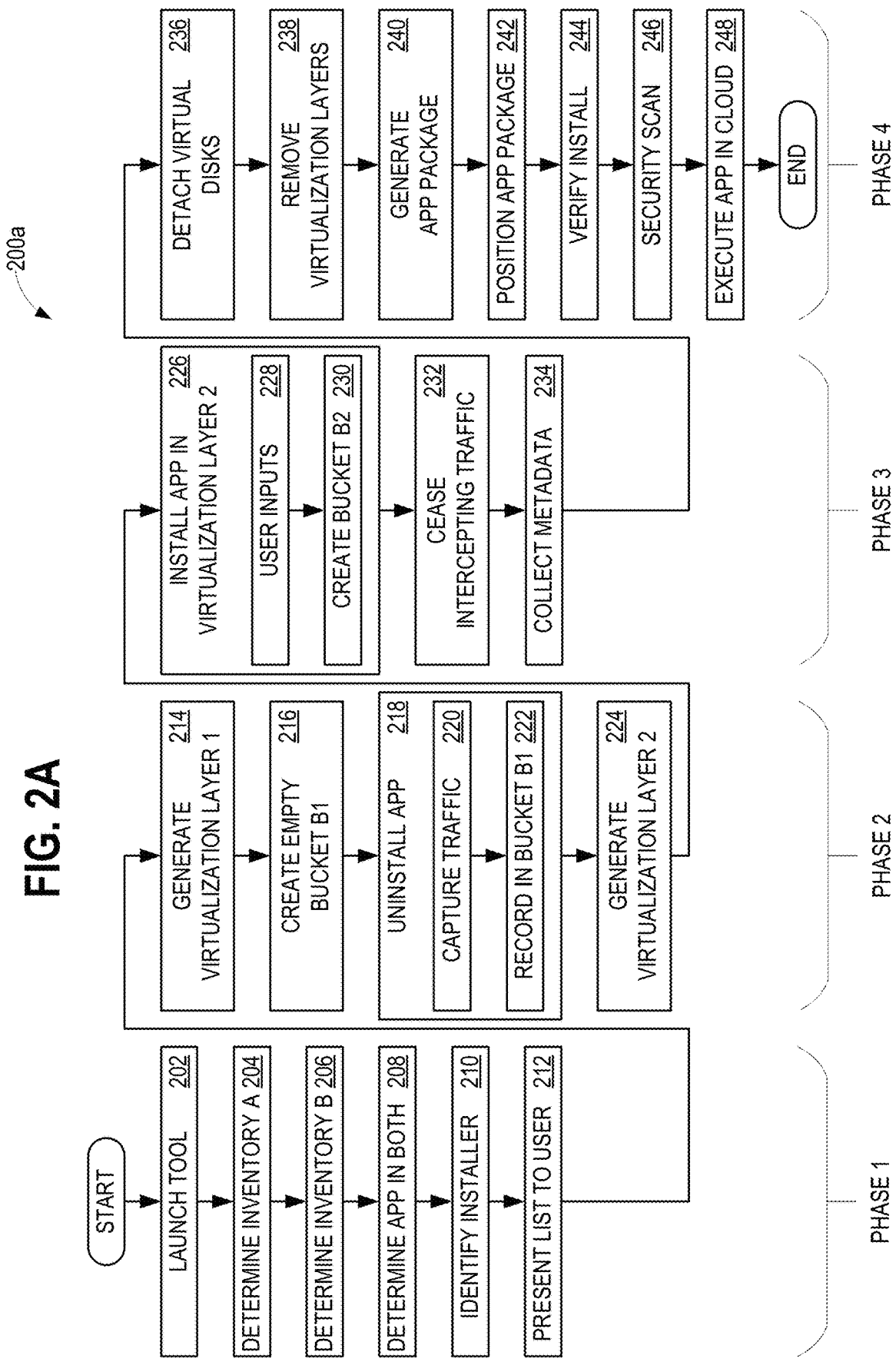

REPOSITIONING APPLICATIONS FROM PHYSICAL DEVICES TO THE CLOUD

BACKGROUND

Virtual desktop infrastructure (VDI) is a form of desktop virtualization in which desktops and applications (apps) located in the cloud (e.g., on a remote node) are available to users to access from anywhere, using any compatible device that is suitably connected to the proper cloud node. The applications run within virtual machines (VMs) or other virtualization structures with results delivered to users over a network. Unfortunately, migrating, or repositioning, applications from physical device desktops to a cloud-based VDI can be burdensome in some scenarios. For example, information technology (IT) administrators to generally need to prepare special clean machines and perform capturing and packaging of applications for users.

Some applications, for which the number of users is insufficient to justify the effort needed for migration, might therefore not be available in VDI. One scenario is that users retain physical devices that run local copies of the applications. Not only does this increase costs, but the myriad of benefits provided by VDI are thus not available to users and administrators for those applications.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The disclosure provides for repositioning (migrating) applications from physical devices to a cloud location without removing the applications from the physical devices. Example implementations include generating, on a device, a first virtualization layer, and uninstalling an application from the first virtualization layer while capturing uninstallation traffic within the first virtualization layer. Example implementations further include generating, on the device, a second virtualization layer, overlaying the second virtualization layer on top of the first virtualization layer, installing the application in the second virtualization layer, and generating, from the second virtualization layer with the installed application, an application package. The application package may be positioned on a remote node for execution.

BRIEF DESCRIPTION OF THE DRAWINGS

The present description will be better understood from the following detailed description read in the light of the accompanying drawings, wherein:

FIG. 2A illustrates a flow chart of exemplary operations associated with the architecture of FIG. 1;

DETAILED DESCRIPTION

Various aspects of the systems and methods described herein provide at least a solution for repositioning or migrating applications from physical devices to a cloud location without the need for a separate clean machine with additional server-side components. This provides advantages of cloud-based availability for the applications while preserving device configurations and minimizing burdens. A virtual uninstall process produces an installation package without requiring a separate clean machine, using the user's machine as is, with the application already natively installed left undisturbed. Thus, a user may continue to use the local version of an application during the transition phase to cloud usage, so that in the event of a problem with the transition, adverse effects on user productivity may be mitigated. Example implementations include generating, on a device, a first virtualization layer, and uninstalling the application from the first virtualization layer while capturing uninstallation traffic within the first virtualization layer. Example implementations further include generating, on the device, a second virtualization layer, overlaying the second virtualization layer on top of the first virtualization layer, installing the application in the second virtualization layer, and generating, from the second virtualization layer with the installed application, an application package. The disclosure is able to then position the application package on a remote node for execution.

Aspects of the disclosure provide an efficient, scalable solution that permits users to relocate applications without requiring potentially expensive information technology (IT) or virtual desktop infrastructure (VDI) workforce intervention. Aspects of the disclosure operate in an unconventional manner by virtually uninstalling an application from a virtualization layer while capturing uninstallation traffic within the virtualization layer. This enables the disclosure to prevent the uninstallation traffic from affecting a copy of the application that is not within the virtualization layer, thereby leaving the installation on the physical device intact. If network problems affect the availability or performance of the application in the cloud, the local copy on the physical device remains as an alternative ready for execution. Thus, aspects of the disclosure provide for repositioning applications from physical devices to a cloud location while improving the reliability of computing operations. Further, this allows improved allocation of resources between the physical devices and the cloud.

Figure 1:
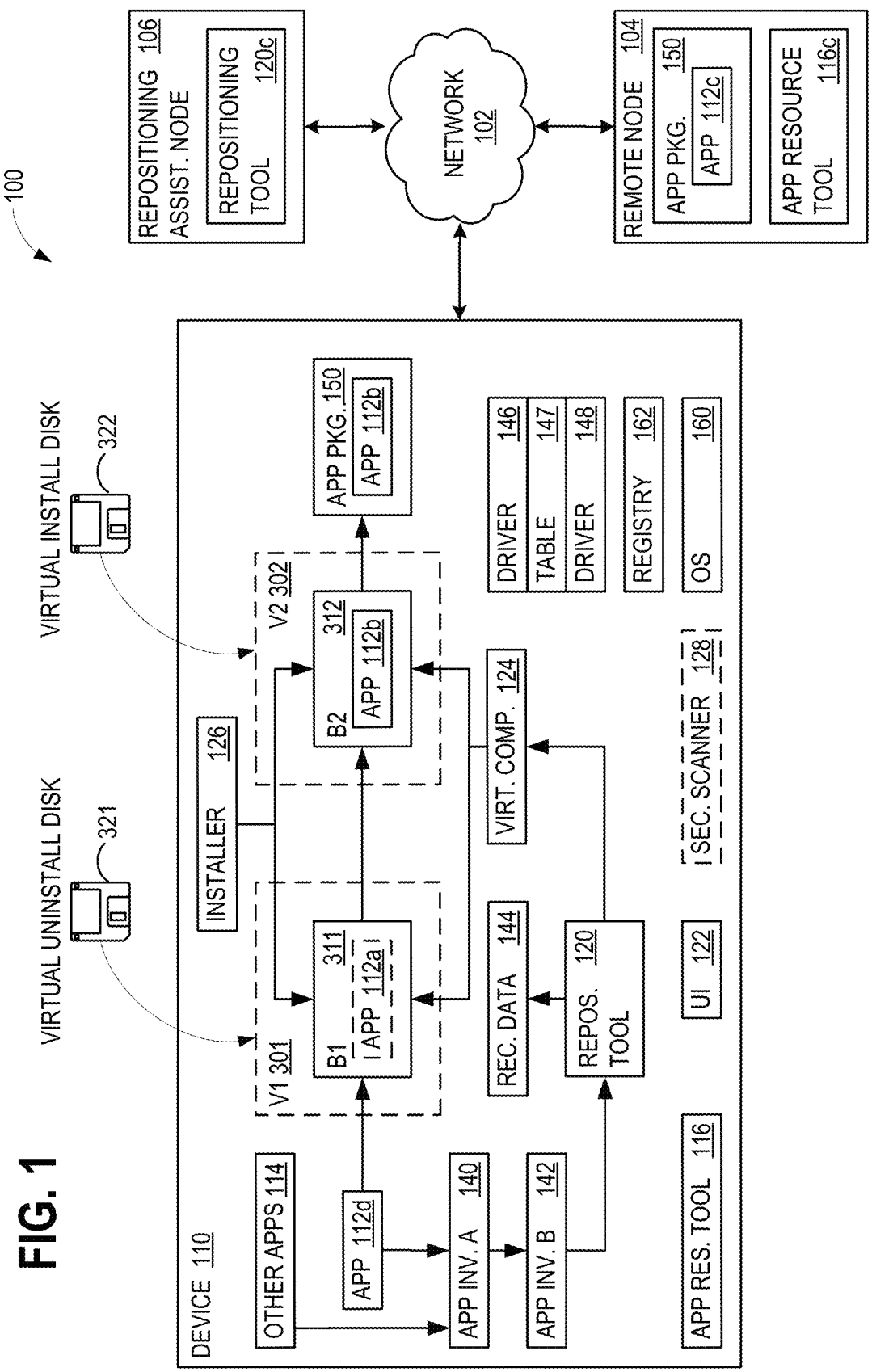
FIG. 1 illustrates a block diagram of an example architecture that can advantageously reposition applications (apps) from physical devices to the cloud.

Aspects of the disclosure identify, capture and package users' installed applications, as they exist in the user's local device, and export packages to a VDI environment, which is generally on a remote node. This occurs in a manner that these applications can be made available on-demand, on any device provided to a user, which can access the VDI environment, such as a secondary physical device. This advantageously allows a user to access applications that had been on the user's primary local device, even when the user's primary local device is lost or otherwise unavailable (e.g., being repaired or upgraded). This provides a BYOA (Bring Your Own Applications) capability that enables users to package and export applications to an application-delivery-system that caters to VDI and/or physical desktop devices, for example, VMware ThinApp, App Volumes or Microsoft MSIX. With BYOA, the user need not provide installers and configuration settings for applications, precluding the need for information technology (IT) administrators to prepare special clean machines and perform capturing and packaging of applications for users. Using the disclosure herein, an end-user is now able to capture and package a currently installed application on a physical device, without requiring a separate clean machine and without modifying or affecting the current installed-state of the application on the physical device. Further, a user need not have capturing and packaging software installed apriori on the physical device FIG. 1 illustrates a block diagram of an example architecture 100 that can advantageously reposition applications from physical devices to the cloud. As used herein, positioning an application in a location, such as a remote node, places a copy of the application at that location so that it is available to a user who can access that location with the proper privileges. Repositioning, or migrating, positions a copy of an application in a second location (e.g., a remote node) that had been available to users at a first location (e.g., a local device), using the application at the first location as the source for the copy. As used herein, repositioning (migrating) does not require deletion of the application from the first location. Architecture 100 is illustrated as having multiple nodes 110, 104, and 106, any of which may be implemented with one or more computing devices 700, which is described in relation to FIG. 7. FIG. 2A illustrates a method of repositioning applications from physical devices to a cloud location in flow chart 200a, divided into example phases. Those skilled in the art will note that each phase may include additional or fewer operations, and that there may be additional or fewer phases. In some examples, operations of flow chart 200a are performed by one or more computing devices 700 of FIG. 7.

The user of a physical device 110 intends to reposition an application 112d, which is on device 110, to a remote node 104 across a network 102. In some examples, remote node 104 is a cloud location providing VDI. In some examples, network 102 is the internet. Device 110 runs an operating system (OS) 160 that tracks installed applications, such as application 112d and other applications 114, and stores information regarding installed applications within a registry 162. When installing applications, OS 160 stores copies of the installers for use during uninstall or repair operations. For example, installer 126 is the installer for application 112d. In some examples, installer 126 is a *.MSI file. As will be explained below, installer 126 will be advantageously leveraged to reposition application 112d to remote node 104.

Figure 4:
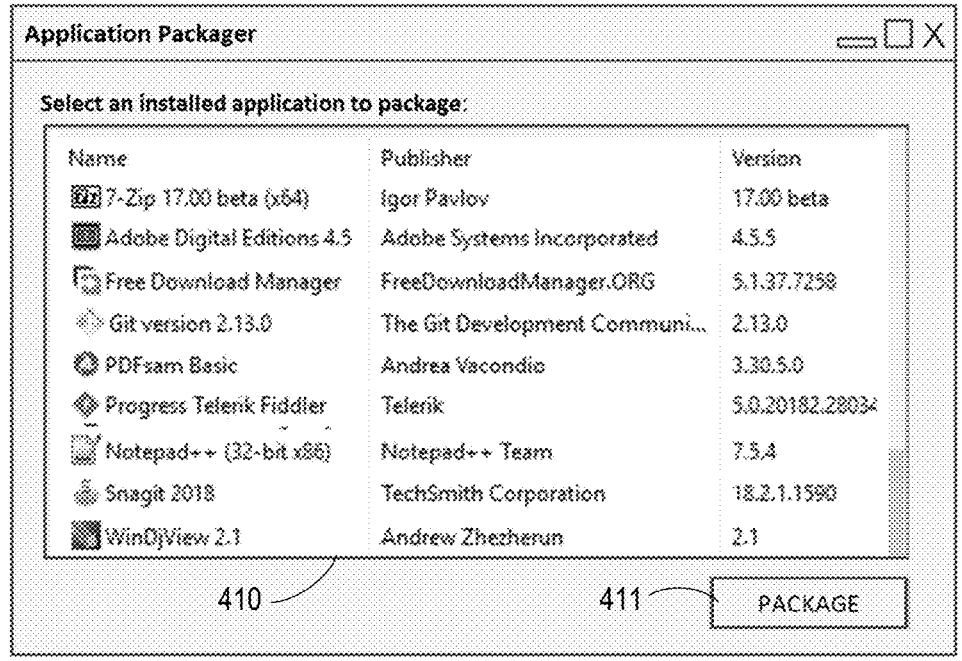
FIG. 4 illustrates user interface (UI) displays that may be used with the architecture of FIG. 1.
Figure 4:
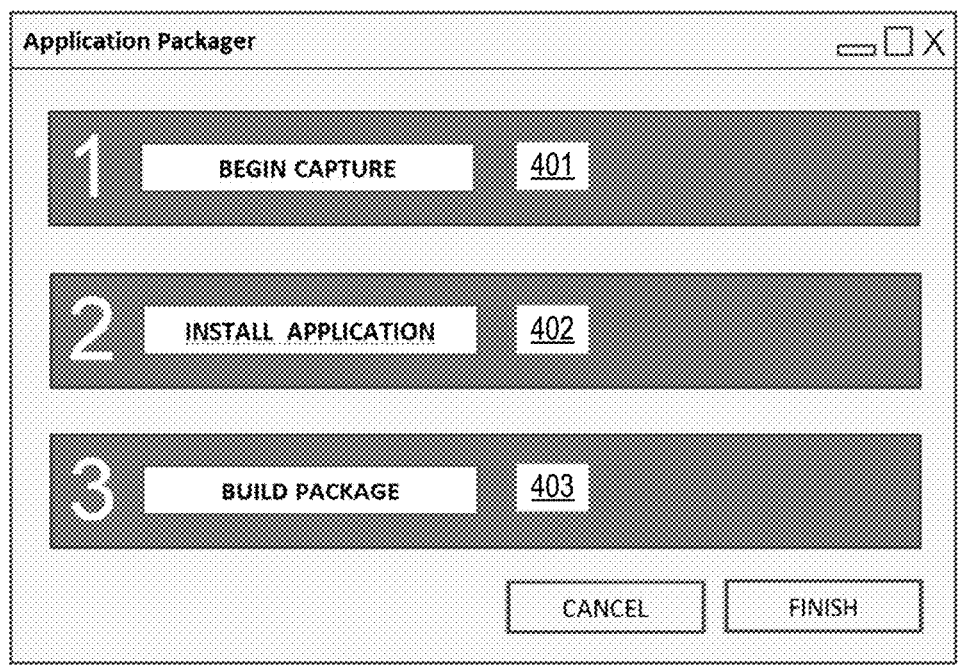

An application resource tool 116 provides a list of applications available to a user, whether on device 110 or in a cloud location such as remote node 104, and may launch the applications. Thus, the user may execute an application on device 110 or execute an application on remote node 104 with application resource tool 116. In some examples, a cloud-service application resource tool 116c on remote node 104 is used alternatively or in addition. A repositioning tool 120 provides for the repositioning operations and uses a user interface (UI) component 122. Examples of displays generated by UI component 122 are shown in FIG. 4.

In some examples, a repositioning assistance node 106, which may be a cloud-based service, provides a cloud-based repositioning tool 120c across network 102. Repositioning operations described below may be controlled by repositioning tool 120 or repositioning tool 120c, independently or in cooperation. In some examples, when repositioning tool 120c controls repositioning operations (e.g., drives the described workflow), modules necessary to perform certain tasks may be downloaded for use and then removed when no longer needed.

A user launches repositioning tool 120 (or repositioning tool 120c) at 202. At 204, repositioning tool 120 scans device 110 to determine inventory A 140, which is a list of applications installed on device 110. In some examples, repositioning tool 120 leverages registry 162. Thus, operation 204 includes determining a first inventory A 140 of applications identified in a list of installed applications (e.g., registry 162) maintained by OS 160 of device 110. Another inventory is derived from the OS's cache of installer files for applications installed on device 110. The intersection of these two inventories forms the set of applications which may be repositioned by repositioning tool 120. Therefore, operation 206 further includes determining, from within inventory A 140, a second inventory B 142 of applications having an installer available. Repositioning tool 120 determines that application 112d is within inventory B 142, at 208, and at 210, repositioning tool 120 identifies installer 126 for application 112d. In some examples, the user may manually locate the application's installer and provide the location as input to repositioning tool 120.

Figure 3:
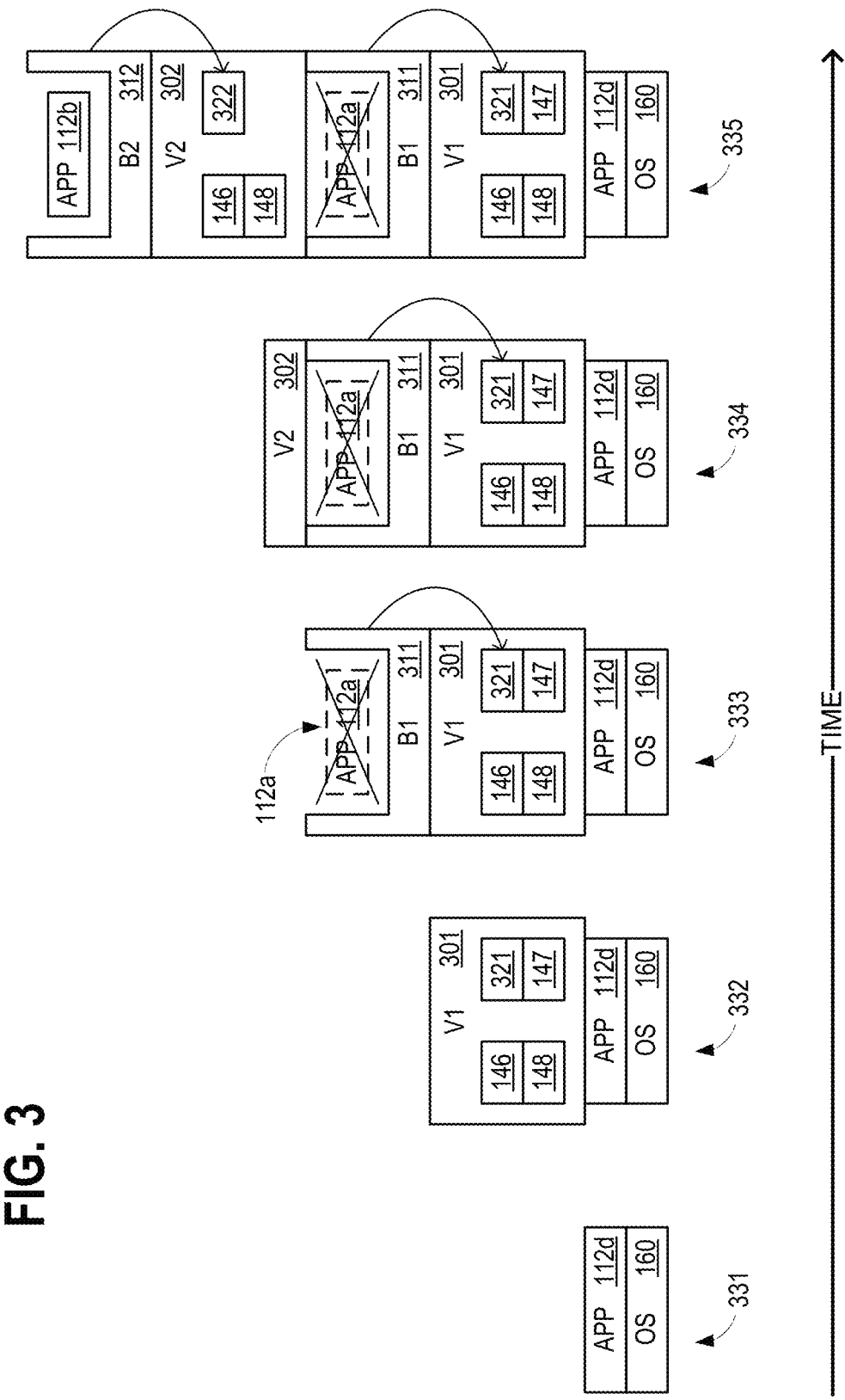
FIG. 3 illustrates a graphical depiction of conditions at various stages of the flow chart of FIG. 2A.

A list of applications available for repositioning with repositioning tool 120 (e.g., inventory B 142) is presented to the user, using UI component 122 (see also FIG. 4), in operation 212, so that the user may select application 112d to reposition to remote node 104. Operations 202-212 form Phase 1 of the repositioning operations. FIG. 3 illustrates a graphical depiction of conditions at various examples stages of flow chart 200a, shown progressing in time. At the completion of Phase 1, condition 331 is present, with device 110 having application 112d and OS 160. Phase 2 of the repositioning operations includes operations 214-224.

Operation 214 includes generating, on device 110, a first virtualization layer V1 301, which is also shown in condition 332 of FIG. 3. Virtualization layer V1 301 is a logical construct implemented and enforced by a file system filter driver 146, a process monitoring driver 148, a table 147, and a virtual uninstall disk 321 having bucket B1 311. In some examples, a hypervisor is not used with virtualization layer V1 301. As depicted in FIG. 3, in some examples, file system filter driver 146, process monitoring driver 148, table 147, and virtual uninstall disk 321 are within virtualization layer V1 301. Virtualization layer V2 302 is similarly implemented, but using virtual install disk 322 having bucket B2 312. As also depicted in FIG. 3, in some examples, another manifestation of each of file system filter driver 146 and process monitoring driver 148, along with virtual install disk 322, are within virtualization layer V2 302, but not a manifestation of table 147. Bucket B1 311 is indicated as being logically within virtual uninstall disk 321, and bucket B2 312 is indicated as being logically within virtual install disk 322.

Virtualization component 124 is used to generate virtualization layer V1 301. Operation 216 includes virtualization component 124 creating bucket B1 311 with empty virtual uninstall disk 321. Virtualization layer V1 301 virtualizes natively installed application 112d, which represents to installer 126 that application 112d is present within virtual uninstall disk 321 as application 112a. Because file system traffic (e.g., file system input/output, I/O) is intercepted and potentially altered, as described below, application 112a can be virtually uninstalled without actually being affected and without the appearance of file system errors that might otherwise occur. Operation 218 includes uninstalling the virtual representation of application 112a from virtualization layer V1 while capturing uninstallation traffic within virtualization layer V1 301. Operation 218 uses installer 126 in quiet (or silent) uninstall mode. Uninstalling application 112a from virtualization layer V1 301 comprises identifying, for application 112d, installer 126 (see operation 210), and uninstalling application 112a using identified installer 126.

Operation 218 includes operations 220 and 222. Operation 220 includes capturing traffic such as uninstallation actions (e.g., delete, create, and modify file actions) affecting registry, file system objects using file system filter driver 146. File system filter driver 146, with the assistance of process monitoring driver 148, tracks child-processes potentially spawned by installer 126. Captured traffic, from these tracked processes, is stored in table 147 that is stored in virtualization layer V1 301. An example of table 147 is:

| object path | Type | state | replica path | flags |
|---|---|---|---|---|
| <file path> | File | D | N/A | |
| <file path> | File | C | <path in disk VUD> | |
| <file path> | File | M | <path in disk VUD> | |
| <reg path> | Reg | M | <path in disk VUD> | | where C, M and D indicate created, modified, and deleted, respectively, and VUD is virtual uninstall disk 321. Virtual uninstall disk 321 acts as a data store for virtualization layer V1 301.

File system filter driver 146 intercepts file system I/O and is able to transform input going into the system, transform output originating from the system, and for a given input, return an output without forwarding to the system. Transformation can take several forms: When a process request system object X, object Y is returned as output; when a process renames system object X to Y, X is renamed Z; when a process deletes system object X, X is not deleted but a success message is still returned; when a process attempts to read object X in some scenarios, an "object-not-found" message is returned; when a process reads object X in some scenarios, X is replicated and cached; when a process modifies system object X, the modification is redirected to a replicated copy, rather than the original object X; and when a process creates a new system object X, it is created only within the attached virtual disk rather than on the physical disk. As used herein, "system object" includes files and registry values. For a virtualization layer, file system filter driver 146, represents logic, the attached virtual disk represents memory, and table 147 represents configuration.

Traffic is recorded in bucket B1 311 at 222. Virtual uninstall disk 321 is mounted at 214, and installer 126 is launched in a suspended state, directing installer 126 to silently uninstall the virtual representation of application 112a. This is shown as condition 333 of FIG. 3. Installer 126 is launched in a suspended state to determine process ID (pid), which is received by process monitoring driver 148. Process monitoring driver 148 notifies file system filter driver 146 of the pid value. Installer 126 then resumes so that it may complete the uninstallation. I/O traffic affecting registry and file system objects is funneled through file system filter driver 146 into table 147. If installer 126 launches additional processes, their launches are intercepted by process monitoring driver 148, which then also notifies file system filter driver 146 of those pids. File system filter driver 146 is thus able to capture traffic originating from processes with pids for which file system filter driver 146 has been notified. Because the traffic funnels through file system filter driver 146, file system filter driver 146 is able to prevent the uninstallation traffic from affecting the installed application (application 112d) on device 110. That is, because application 112d is not within virtualization layer V1 301, the uninstallation traffic is prevented from affecting application 112d.

As traffic funnels through file system filter driver 146, file system filter driver 146 responds to open operations and read operations by consulting table 147 and not permitting the traffic to travel out of virtualization layer V1 301 to affect device 110 outside of virtualization layer V1 301. For create and modify operations, file system filter driver 146 replicates the object, as present on device 110, and stores the replica within virtualization layer V1 301, concurrently recording entries (marked C or M) in table 147. For delete operations, the file system filter driver 146 simply makes an entry (marked D) in table 147, preventing the delete from affecting device 110. When a file-open operation is received for a file that is marked D (deleted), the file system filter driver 146 consults table 147 and returns a file-not-found error. When a file-open operation is received for a file that is marked C (created) or M (modified), the file's instance (copy) in virtualization layer V1 301 is returned. When a file-open operation is received for a file that is not present in table 147, the file's instance on device 110 is returned.

As installer 126 uninstalls application 112a, its actions are honored and the resulting state is captured in a bucket B1 311, embodied inside virtual uninstall disk 321. See condition 333 of FIG. 3. Installer 126 thus receives indications that it is properly completing the uninstallation task, even as application 112d remains unaffected. When the uninstallation is complete, process monitoring driver 148 intercepts the exit of installer 126 (using the pid) and notifies file system filter driver 146 to stop intercepting traffic from the previously identified pids. Virtual uninstall disk 321 is then unmounted, and bucket B1 311 holds the state of a disk with application 112a having been uninstalled. In addition to the real-time captured traffic, additional information potentially needed to assist subsequent phases such as before/after changes, timestamps, configuration, guiding instructions and automation scripts, may also be determined, generated and stored in recorded data 144.

Operation 224 includes generating, on device 110, a second virtualization layer V2 302. Virtualization component 124 is also used to generate virtualization layer V2 302. Virtualization layer V2 302 provides for an empty virtual install disk 322 that is mounted and into which application 122b (a copy of application 112d) is installed. Virtual uninstall disk 321 of virtualization layer V1 301 is remounted as read-only. This is illustrated as condition 334 in FIG. 3, and completes Phase 2 of the repositioning operations. Phase 3 of the repositioning operations includes operations 226-234.

Operation 226 includes installing application 112b in virtualization layer V2 302, specifically in virtual install disk 322. Operation 226 includes operation 228 and operation 230. Operation 228 includes accepting user inputs to guide the installation, for example by allowing the user to select from among various installation options. When installer 126 operates in quiet mode, real-time user inputs are not accepted. Operation 230 creates a bucket B2 312 to capture installation information such as file system and registry changes. Bucket B2 312 will later be used to generate an application package 150 that contains application 112b and is suitable to run on remote node 104. This is illustrated as condition 335 of FIG. 3. In some examples, installing application 112b in virtualization layer V2 302 comprises installing application 112b using installer 126 (the installer for the application).

Installer 126 sees application 112b as uninstalled because of the presence of virtual uninstall disk 321. Installer 126 is launched with directions to install application 112b, but is launched in a suspended state. Process monitoring driver 148 receives the pid of installer 126 which then notifies file system filter driver 146 of the pid value. Installer 126 then resumes so that it may complete the installation. I/O traffic affecting registry objects is funneled through file system filter driver 146 into table 147. If installer 126 launches additional processes, their launches are intercepted by process monitoring driver 148, which then also notifies file system filter driver 146 of those pids. File system filter driver 146 is thus able to capture traffic originating from processes with pids for which file system filter driver 146 has been notified. In this manner data is collected by bucket B2 312 for use in generating application package 150.

As traffic funnels through file system filter driver 146, file system filter driver 146 responds to open commands and read commands by consulting table 147. The state of the object is first checked in bucket B2 312, inside virtual install disk 322. If the object is present in virtual install disk 322, the copy (instance) in virtual install disk 322 is returned. If the object is marked deleted in virtual install disk 322, an object-not-found error is returned. If the object is not in virtual install disk 322 at all, the object's state in bucket B1 311 inside virtual uninstall disk 321 is checked. If the object is marked as deleted in virtual uninstall disk 321, an object-not-found result is returned. If an object is marked as created or modified in virtual uninstall disk 321, the instance in virtual uninstall disk 321 is returned, regardless of whether the object also exists on device 110 outside virtual uninstall disk 321.

If the object is neither in virtual install disk 322 nor virtual uninstall disk 321, the object's instance in device 110 (outside of both virtualization layer V1 301 and virtualization layer V2 302) is returned. When a create, write, or delete command is received for an object, the corresponding action occurs within virtual install disk 322. An object marked deleted in virtual uninstall disk 321 is created anew in virtual install disk 322. An object marked created or modified in virtual uninstall disk 321 or device 110 is replicated into virtual install disk 322 and returned as its virtual install disk 322 instance, regardless of whether it exists beforehand on device 110 and/or virtual uninstall disk 321. When a delete operation is received for an object, the object is marked as deleted in virtual install disk 322, regardless of whether the object is recorded in virtual uninstall disk 321, or exists on device 110.

When installation is complete, the process monitoring driver 148 intercepts the exit of installer 127 and notifies file system filter driver 146 (using the pid) to stop intercepting traffic from the previously identified pids, at 232. Metadata, including identification of installed applications, licensing and OS 160 configuration, may be collected in operation 234 and stored as recorded data 144. This is the completion of Phase 3 of the repositioning operations.

Phase 4 of the repositioning operations is the post-processing phase. At 236, virtual uninstall disk 321 and virtual install disk 322 are unmounted (detached), but device 110 remains in its original state with application 112d still installed. File system filter driver 146 and process monitoring driver 148 are shut down. Operation 238 includes removing, from device 110, virtualization layer V1 301 and virtualization layer V2 302. This shuts down the drivers and unmounts both uninstall disk 321 and virtual install disk 322. Virtual uninstall disk 321 is discarded. Operation 240 includes generating application package 150. Application package 150 is generated from bucket B2 312 (with installed application 112b), contained within virtual install disk 322, so that is it suitable to run on remote node 104. In some examples, application package 150 is generated so that it is suitable to run on VDI. Virtual uninstall disk 322 is discarded. In some examples, operations 202-240 occur on a single machine, the user's device (e.g., device 110), whereas subsequent operations involve remote node 104 and/or repositioning assistance node 106.

Operation 242 includes positioning application package 150 on remote node 104 for execution. In some examples, operation 242 is delayed after operation 240, such as if application package 150 is generated and stored for a later (future) use. Application package 150 can be mounted on another machine, making application 112b available to the user as part of the user's cloud-based ecosystem. The installation of application 112b on remote node 104 (via application package 150) is verified in operation 244, using an administrative tool that is suitable for such verification. The storage, introduction and verification of application package 150, as it is positioned in remote node 104 may depend on specific cloud/VDI tools and workflows in use for remote node 104. Status may then be reported to the user via repositioning tool 120. Operation 246 includes performing a security scan on application 112c and/or application package 150 using security scanner 128. In some examples, security scanner 128 is not located on device 110, but is instead located in an administrator environment, such as a server-side machine controlled by an administrator. In some examples, security scanner 128 is run on application 112d in an administrator environment at some point prior to Phase 2 of the repositioning operations. If the security scan fails, the repositioning operations may be terminated, for example by repositioning tool 120 refusing to proceed through Phase 2. In some examples, security scanner 128 is run on application 112d in device 110 in Phase 4 of the repositioning operations.

Operation 248 includes executing application package 150 (and thus application 112b) on remote node 104. If operation 246 had not been skipped and a safe condition was used as a precedent to proceed to operation 248, then together, operations 246 and 248 include: prior to executing application package 150 on remote node 104, performing a security scan on application 112c or application package 150; and based at least on the security scan determining that execution is safe, executing application package 150 on remote node 104. Security scan options include scanning files and objects (such as registry values and scripts) inside virtual install disk 322, and running a dynamic live scan to verify the installation of operation 244 and permitting application 112c to execute. In some examples, security scans are performed in administrator environments, rather than on user devices. In some examples, the operations described above are not necessarily performed in immediate succession, and/or may be performed in a different order.

Figure 2B:
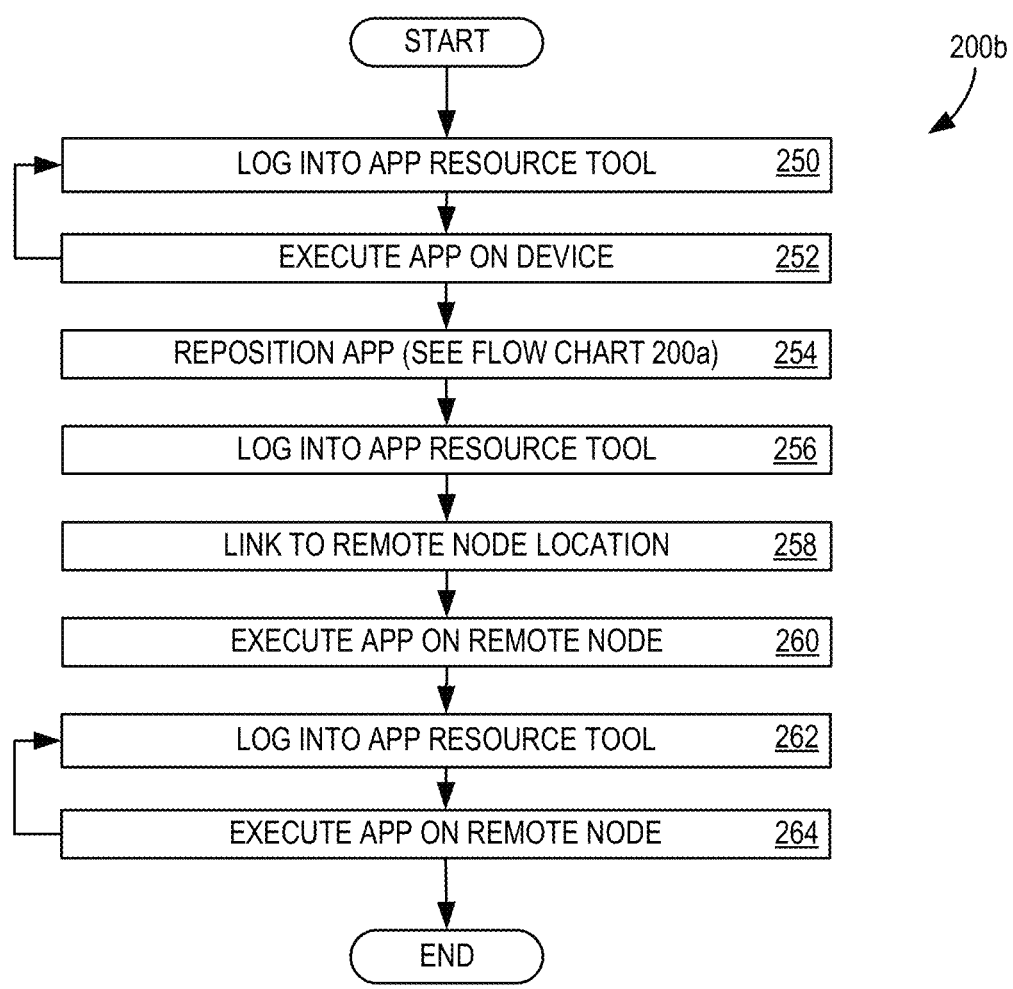
FIG. 2B illustrates another flow chart of exemplary operations associated with the architecture of FIG. 1.

FIG. 2B illustrates a flow chart 200b of exemplary operations that extend the method illustrated in flow chart 200a. In some examples, operations of flow chart 200b are performed by one or more computing devices 700 of FIG. 7. Prior to positioning application package 150 on remote node 104, the user logs into application resource tool 116 at 250. At 252, the user executes application 112d on device 110 with application resource tool 116. The user continues to use the local copy of application 112, as needed. At 254, operations of flow chart 200a are used to reposition application 112d as application 112c within application package 150. After positioning application package 150 on remote node 104, the user logs into application resource tool 116 at 256.

In operation 258, application resource tool 116 links to application 112c within application package 150 to enable the user to launch application 112c from application resource tool 116. In some examples, application resource tool 116 synchronizes with application resource tool 116c to add application 112c to application resource tool 116c. At 260, the user is then able to execute application 112c on remote node 104 with application resource tool 116 or 116c. The next time the user logs into application resource tool 116 or 116c at 262, application 112c is already available. At 264, the user executes application 112c on remote node 104 with application resource tool 116 or 116c. The user continues to use the cloud-based copy of application 112b (as embodied in application package 150 or 112c), as needed.

FIG. 4 illustrates various example displays 400a and 400b that may be presented to the user by UI component 122 (of FIG. 1) during the operations of flow chart 200a of FIG. 2A. Display 400a includes a window 410 that shows the list of applications available for repositioning with repositioning tool 120 (e.g., inventory B 142) that was presented to the user during operation 212 of FIG. 2A. The user is able to select an application from within window 410 and then click on a Package button 411 to move into Phase 2 of the repositioning operations and show display 400b. Display 400b has buttons that move repositioning operations through Phases 2-4. A Begin Capture button 401 initiates Phase 2, an Install Application button 402 initiates Phase 3, and a Build Package button 403 initiates Phase 4. In some examples, however, a single-click triggers all of the relocation/migration processes, even for a set of multiple selected applications. A single-click operation may run installer 126 in quiet mode.

Figure 5:
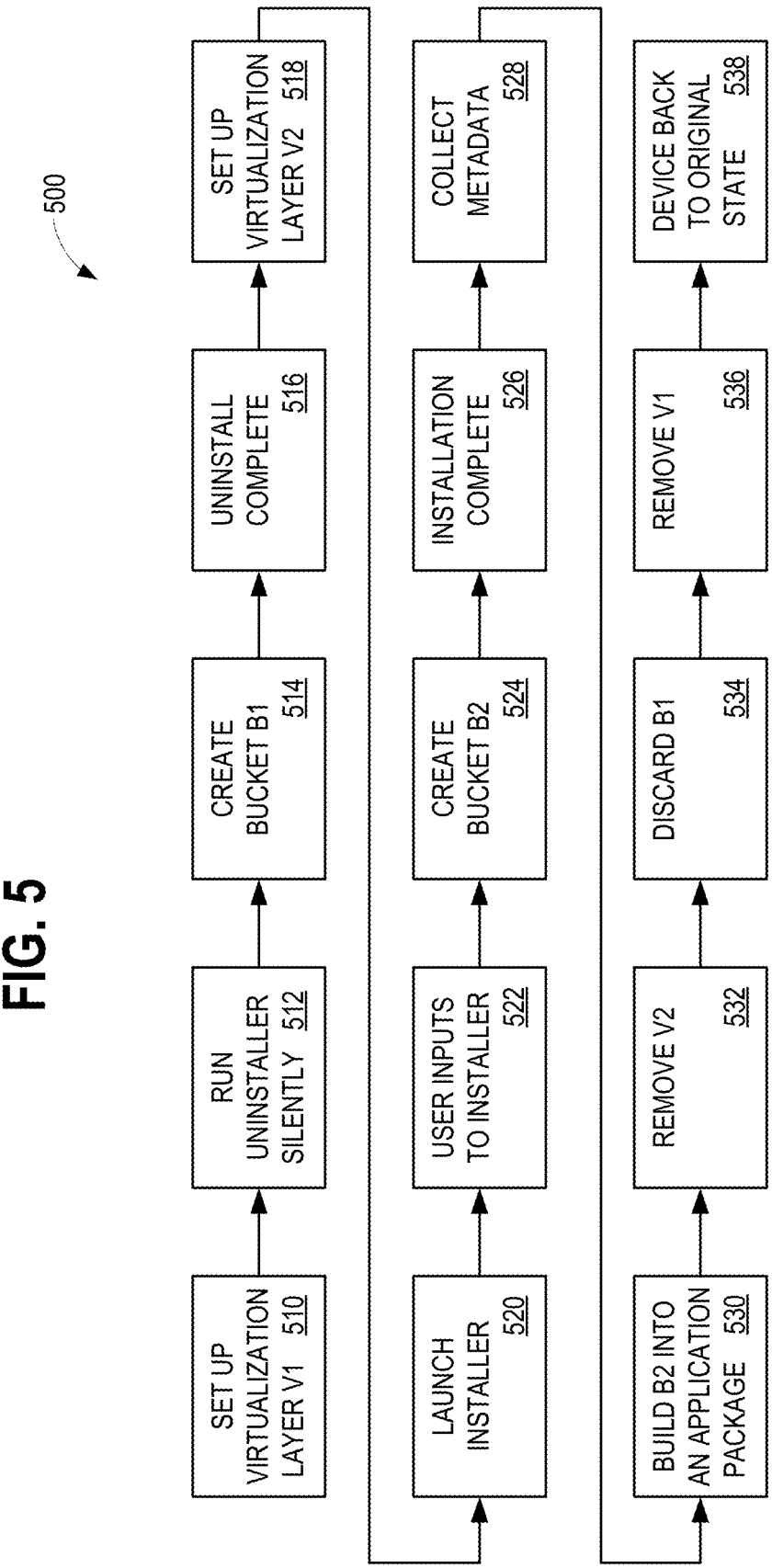
FIG. 5 illustrates a process flow of activity as controlled by the UI of FIG. 4.

FIG. 5 illustrates a process flow 500 of activity as controlled by UI component 122. Activities 510-518 correspond to Phase 2 of the repositioning operations, activities 520-528 correspond to Phase 3, and the completion of activities 530-538 correspond to the completion of Phase 4. However, activities 510-538 are described more generally than the operations of flow chart 200a.

Activity 510 sets up virtualization layer V1 301, activity 512 runs installer 126 silently as an uninstaller, and activity 514 creates bucket B1 311. At 516, uninstallation is complete, and virtualization layer V2 302 is set up in activity 518. Installer 126 is launched again at 520, but this time for installation, and the user provides inputs to installer 126 as part of activity 522. Bucket B2 312 is created in activity 524, and the installation is complete at 526. Activity 528 includes collecting and storing metadata in recorded data 144. Activity 530 builds bucket B2 312 into application package 150, and clean-up activities 532-536 begin. Virtualization layer V2 302 is removed from device 110 at 532, bucket B1 311 is discarded at 534, and virtualization layer V1 301 is removed from device 110 at 536. At 538, device 110 is back to its original state, but with application 112b available to the user in the cloud.

Figure 6:
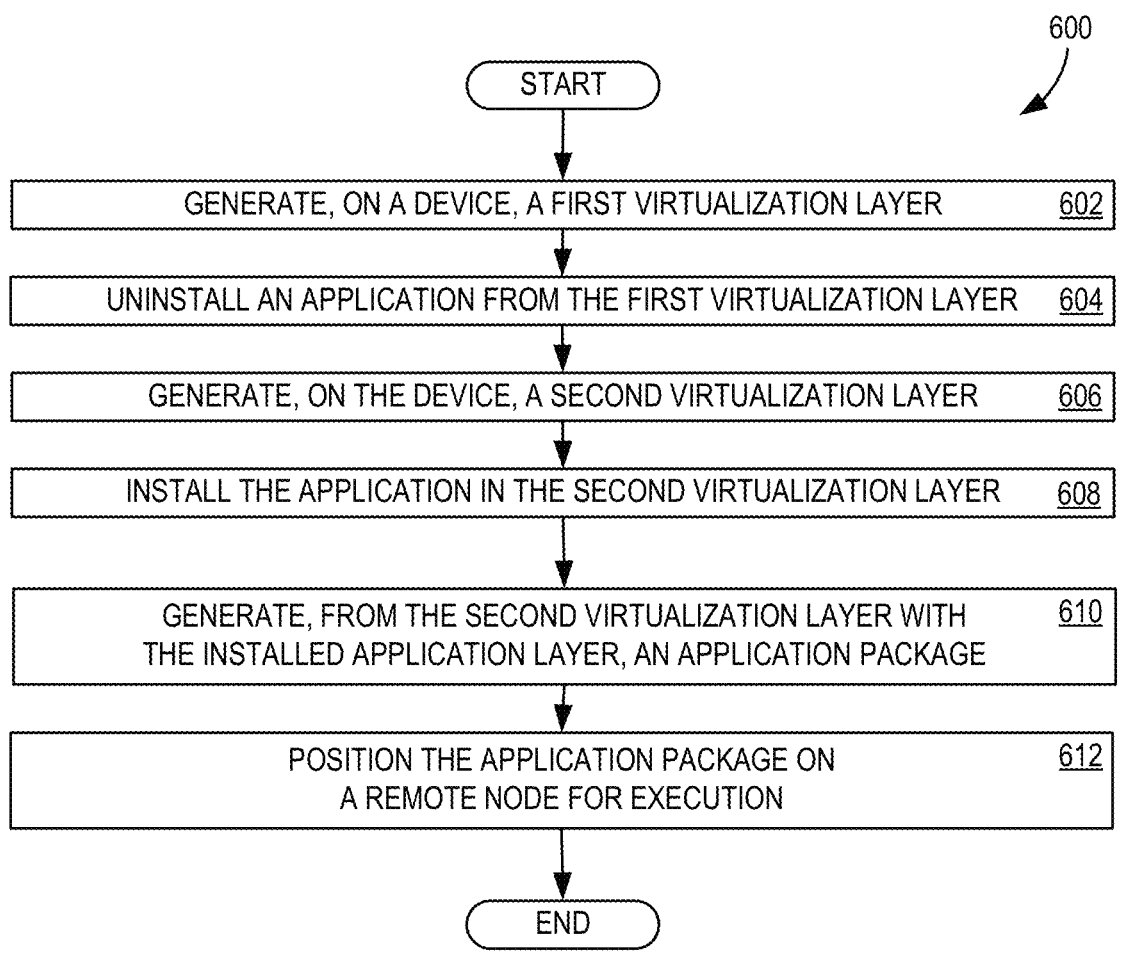
FIG. 6 illustrates another flow chart of exemplary operations associated with the architecture of FIG. 1.

FIG. 6 illustrates a flow chart 600 showing a method of repositioning applications from physical devices to a cloud location. Operation 602 includes generating, on a device, a first virtualization layer. Operation 604 includes uninstalling an application from the first virtualization layer. Operation 606 includes generating, on the device, a second virtualization layer. Operation 608 includes installing the application in the second virtualization layer. Operation 610 includes generating, from the second virtualization layer with the installed application, an application package. In some examples, the delivery format is a selected one of VMware ThinApp, App Volumes, and Microsoft MSIX. Operation 612 includes positioning the application package, which is in a format that preserves the existing functionality and permits it to execute in a new environment, on a remote node for execution.

Figure 7:
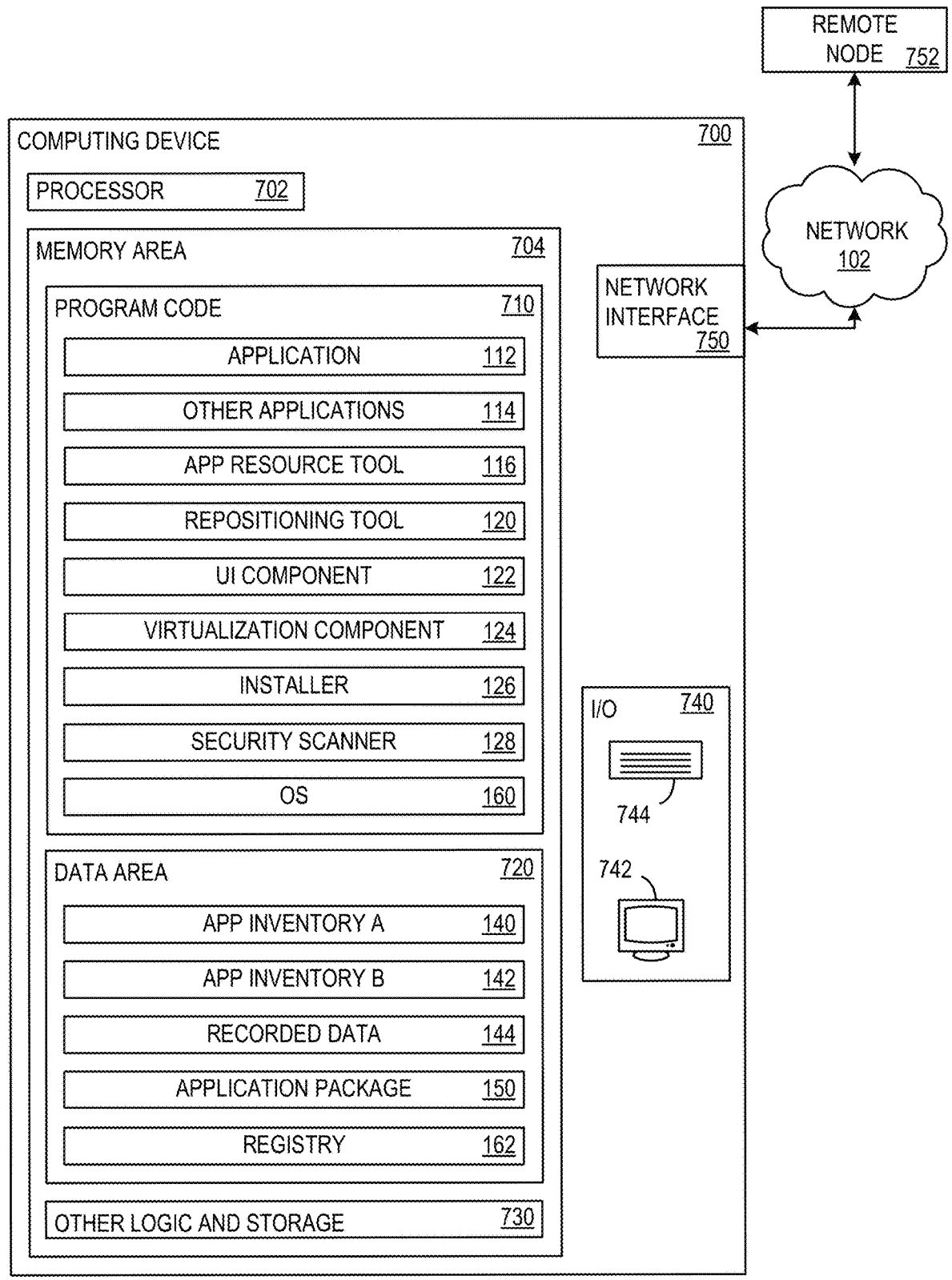
FIG. 7 illustrates a block diagram of a computing device that may be used with the architecture of FIG. 1, according to an example embodiment.

FIG. 7 illustrates a block diagram of computing device 700 that may be used with architecture 100 of FIG. 1. With reference to FIG. 1, computing device 700 may be used for any of device 110, remote node 104 and repositioning assistance node 106. Computing device 700 has at least a processor 702 and a memory area 704 (or memory 704) that holds program code 710, a data area 720, and other logic and storage 730. Memory area 704 is any device allowing information, such as computer executable instructions and/or other data, to be stored and retrieved. For example, memory area 704 may include one or more random access memory (RAM) modules, flash memory modules, hard disks, solid-state disks, and/or optical disks. Program code 710 comprises computer executable instructions, and computer executable components including an application 112 that represents any of application 112d, and 112b, other applications 114, application resource tool 116 (which may also represent application resource tool 116c), repositioning tool 120 (which may also represent repositioning tool 120c), UI component 122, virtualization component 124, installer 126, security scanner 128, and OS 160.

Data area 720 holds application inventory A 140, application inventory B 142, recorded data 144, application package 150, and registry 162. Memory area 704 also includes other logic and storage 730 that performs or facilitates other functions disclosed herein or otherwise required of computing device 700. A keyboard 744 and a computer monitor 742 are illustrated as an exemplary portion of an input/output component 740. A network interface 750 permits communication over network 102 with remote node 752, which may represent any of the nodes identified in FIG. 1.

Computing device 700 represents any device executing instructions (e.g., as application programs, operating system functionality, or both) to implement the operations and functionality described herein. Computing device 700 may include any portable or non-portable device including a mobile telephone, laptop, tablet, computing pad, netbook, gaming device, portable media player, desktop personal computer, kiosk, embedded device, and/or tabletop device. Additionally, computing device 700 may represent a group of processing units or other computing devices, such as in a cloud computing system or service. Processor 702 may include any quantity of processing units and may be programmed to execute any components of program code 710 comprising computer executable instructions for implementing aspects of the disclosure. In some embodiments, processor 702 is programmed to execute instructions such as those illustrated in the figures.

Additional Examples

An example system for repositioning applications from physical devices to a cloud location comprises: a processor; and a non-transitory computer readable medium having stored thereon program code, the program code causing the processor to; generate, on a device, a first virtualization layer; uninstall an application from the first virtualization layer while capturing uninstallation traffic within the first virtualization layer; generate, on the device, a second virtualization layer; install the application in the second virtualization layer; generate, from the second virtualization layer with the installed application layer, an application package; and position the application package on a remote node for execution.

An exemplary method of repositioning applications from physical devices to a cloud location comprises: generating, on a device, a first virtualization layer; uninstalling an application from the first virtualization layer while capturing uninstallation traffic within the first virtualization layer; generating, on the device, a second virtualization layer; installing the application in the second virtualization layer; generating, from the second virtualization layer with the installed application, an application package; and positioning the application package on a remote node for execution.

One or more exemplary non-transitory computer storage medium have computer-executable instructions that, upon execution by a processor, cause the processor to at least perform operations that comprise: generating, on a device, a first virtualization layer; uninstalling an application from the first virtualization layer while capturing uninstallation traffic within the first virtualization layer; generating, on the device, a second virtualization layer; installing the application in the second virtualization layer; generating, from the second virtualization layer with the installed application, an application package; and positioning the application package on a remote node for execution.

Alternatively, or in addition to the other examples described herein, examples include any combination of the following:

determining a first inventory of applications identified in a list of installed applications maintained by an OS of the device;
    determining, from within the first inventory, a second inventory of applications having an installer available;
    determining that the application is within the second inventory;
    overlaying the second virtualization layer on top of the first virtualization layer;
    uninstalling the application from the first virtualization layer comprises identifying, for the application, an installer and uninstalling the application using the installer for the application;
    identifying, for the application, the installer;
    uninstalling the application using the installer for the application;
    installing the application in the second virtualization layer comprises installing the application using the installer for the application;
    installing the application using the installer for the application;
    preventing the uninstallation traffic from affecting a copy of the application on the device that is not within the first virtualization layer;
    removing, from the device, the first virtualization layer and the second virtualization layer;
    prior to positioning the application package on the remote node, logging into an application resource tool and, with the application resource tool, executing the application on the device;
    logging into an application resource tool;
    with the application resource tool, executing the application on the device;
    after positioning the application package on the remote node:
    logging into an application resource tool;
    with the application resource tool, executing the application on the remote node.
    prior to executing the application package on the remote node, performing a security scan on the application or the application package; and
    based at least on the security scan determining that execution is safe, executing the application package on the remote node.

Exemplary Operating Environment

While described with reference to VMs in various examples, the disclosure is operable with any form of virtual computing instance (VCI) including, but not limited to, VMs, containers, or other types of VCIs. In examples that involve a hardware abstraction layer on top of a host computer (e.g., server), the hardware abstraction layer allows multiple containers to share the hardware resource. These containers, isolated from each other, have at least a user application running therein. The hardware abstraction layer thus provides benefits of resource isolation and allocation among the containers. In some examples, VMs are used alternatively or in addition to the containers, and hypervisors are used for the hardware abstraction layer. In these examples, each VM generally includes a guest operating system in which at least one application runs.

For the container examples, it should be noted that the disclosure applies to any form of container, such as containers not including a guest operating system (OS), referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources may be isolated, services restricted, and processes provisioned to have a private view of the operating system with their own process ID space, file system structure, and network interfaces. Multiple containers may share the same kernel, but each container may be constrained to only use a defined amount of resources such as CPU, memory and I/O.

The operations described herein may be performed by a computer or computing device. The computing devices comprise processors and computer readable media. By way of example and not limitation, computer readable media comprise computer storage media and communication media. Computer storage media include volatile and non-volatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special purpose computing device when programmed to execute the instructions described herein. The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, computing devices, or the like, this is only an exemplary implementation and not a limitation. As those skilled in the art will appreciate, the present embodiments are suitable for application in a variety of different types of computing devices, for example, PCs, servers, laptop computers, tablet computers, etc.

The term "computing device" and the like are used herein to refer to any device with processing capability such that it can execute instructions. Those skilled in the art will realize that such processing capabilities are incorporated into many different devices and therefore the terms "computer", "server", and "computing device" each may include PCs, servers, laptop computers, mobile telephones (including smart phones), tablet computers, and many other devices. Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of repositioning applications from physical devices to a cloud location, the method comprising:
    generating, on a device, a first virtualization layer, the first virtualization layer including a virtual uninstall disk containing a virtual representation of an application;
    uninstalling the virtual representation of the application from the first virtualization layer while capturing uninstallation traffic within the first virtualization layer;
    generating, on the device, a second virtualization layer, the second virtualization layer including an empty virtual install disk;
    installing a copy of the application in the empty virtual install disk included in the second virtualization layer;
    generating, from the second virtualization layer with the installed application, an application package; and
    transferring the application package to a remote node for execution.

2. The method of claim 1, further comprising:
    determining a first inventory of applications identified in a list of installed applications maintained by an operating system (OS) of the device;
    determining a second inventory of installed applications from a cache of installer files for applications installed on the device;

determining a set of applications that are contained both in the first inventory, and the second inventory, the set consisting of applications having an installer available and installed on the device; and
determining that the application is within the set.

3. The method of claim 2,
wherein uninstalling the application from the first virtualization layer comprises:
identifying, for the application, the installer; and
uninstalling the application using the installer for the application; and
wherein installing the application in the second virtualization layer comprises:
installing the application using the installer for the application.

4. The method of claim 1, further comprising:
preventing the uninstallation traffic from affecting a copy of the application on the device that is not within the first virtualization layer.

5. The method of claim 1, further comprising:
removing, from the device, the first virtualization layer and the second virtualization layer.

6. The method of claim 1, further comprising:
prior to transferring the application package to the remote node:
logging into an application resource tool; and
with the application resource tool, executing the application on the device; and
after transferring the application package to the remote node:
logging into the application resource tool; and
with the application resource tool, executing the application on the remote node.

7. The method of claim 1, further comprising:
prior to executing the application package on the remote node, performing a security scan on the application or the application package; and
based at least on the security scan determining that execution is safe, executing the application package on the remote node.

8. A computer system for repositioning applications from physical devices to a cloud location, the computer system comprising:
a processor; and
a non-transitory computer readable medium having stored thereon program code, the program code causing the processor to:
generate, on a device, a first virtualization layer, the first virtualization layer including a virtual uninstall disk containing a virtual representation of an application;
uninstall the virtual representation of the application from the first virtualization layer while capturing uninstallation traffic within the first virtualization layer;
generate, on the device, a second virtualization layer, the second virtualization layer including an empty virtual install disk;
install a copy of the application in the empty virtual install disk included in the second virtualization layer;
generate, from the second virtualization layer with the installed application, an application package; and
transfer the application package to a remote node for execution.

9. The computer system of claim 8, wherein the program code is further operative to:
determine a first inventory of applications identified in a list of installed applications maintained by an operating system (OS) of the device;
determine a second inventory of installed applications from a cache of installer files for applications installed on the device;
determine a set of applications that are contained both in the first inventory and second inventory, the set consisting of applications having an installer available and installed on the device; and
determine that the application is within the set.

10. The computer system of claim 9,
wherein uninstalling the application from the first virtualization layer comprises:
identifying, for the application, the installer; and
uninstalling the application using the installer for the application; and
wherein installing the application in the second virtualization layer comprises:
installing the application using the installer for the application.

11. The computer system of claim 8, wherein the program code is further operative to:
prevent the uninstallation traffic from affecting a copy of the application on the device that is not within the first virtualization layer.

12. The computer system of claim 8, wherein the program code is further operative to:
removing, from the device, the first virtualization layer and the second virtualization layer.

13. The computer system of claim 8, wherein the program code is further operative to:
prior to transferring the application package to the remote node:
logging into an application resource tool; and
with the application resource tool, executing the application on the device; and
after transferring the application package to the remote node:
logging into the application resource tool; and
with the application resource tool, executing the application on the remote node.

14. The computer system of claim 8, wherein the program code is further operative to:
prior to executing the application package on the remote node, perform a security scan on the application or the application package; and
based at least on the security scan determining that execution is safe, execute the application package on the remote node.

15. A non-transitory computer readable storage medium having stored thereon program code executable by a first computer system at a first site, the program code embodying a method comprising:
generating, on a device, a first virtualization layer, the first virtualization layer including a virtual uninstall disk containing a virtual representation of an application;
uninstalling the virtual representation of the application from the first virtualization layer while capturing uninstallation traffic within the first virtualization layer;
generating, on the device, a second virtualization layer, the second virtualization layer including an empty virtual install disk;
installing a copy of the application in the empty virtual install disk included in the second virtualization layer;

generating, from the second virtualization layer with the installed application, an application package; and transferring the application package to a remote node for execution.

16. The non-transitory computer storage medium of claim 15, wherein the program code further comprises:

determining a first inventory of applications identified in a list of installed applications maintained by an operating system (OS) of the device;

determining a second inventory of installed applications from a cache of installer files for applications installed on the device;

determining a set of applications that are contained both in the first inventory and the second inventory, the set consisting of applications having an installer available and installed on the device; and determining that the application is within the set.

17. The non-transitory computer storage medium of claim 16, wherein uninstalling the application from the first virtualization layer comprises:

identifying, for the application, the installer; and uninstalling the application using the installer for the application; and wherein installing the application in the second virtualization layer comprises:

installing the application using the installer for the application.

18. The non-transitory computer storage medium of claim 15, wherein the program code further comprises:

preventing the uninstallation traffic from affecting a copy of the application on the device that is not within the first virtualization layer.

19. The non-transitory computer storage medium of claim 15, wherein the program code further comprises:

prior to transferring the application package to the remote node:

logging into an application resource tool; and with the application resource tool, executing the application on the device; and after transferring the application package to the remote node:

logging into the application resource tool; and with the application resource tool, executing the application on the remote node.

20. The non-transitory computer storage medium of claim 15, wherein the program code further comprises:

prior to executing the application package on the remote node, performing a security scan on the application or the application package; and based at least on the security scan determining that execution is safe, executing the application package on the remote node.

* * * * *